United States Patent
Onishi

(10) Patent No.: US 9,873,462 B2
(45) Date of Patent: Jan. 23, 2018

(54) VEHICLE FLOOR PORTION STRUCTURE

(71) Applicant: TOYOTA JIDOSHA KABUSHIKI KAISHA, Toyota-shi (JP)

(72) Inventor: Yoichiro Onishi, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/278,810

(22) Filed: Sep. 28, 2016

(65) Prior Publication Data

US 2017/0106906 A1   Apr. 20, 2017

(30) Foreign Application Priority Data

Oct. 19, 2015  (JP) .................................. 2015-205882

(51) Int. Cl.
  *B62D 25/20* (2006.01)
(52) U.S. Cl.
  CPC ................................ *B62D 25/2036* (2013.01)
(58) Field of Classification Search
  CPC ................................ B62D 21/15; B62D 25/20
  USPC ... 296/204, 203.01, 203.03, 193.07, 209, 30
  See application file for complete search history.

(56) References Cited

U.S. PATENT DOCUMENTS

| | | | | |
|---|---|---|---|---|
| 5,354,115 A | * | 10/1994 | Esaki | B62D 25/025 296/187.12 |
| 5,921,618 A | * | 7/1999 | Mori | B62D 21/157 296/187.12 |
| 2012/0153682 A1 | * | 6/2012 | Rawlinson | B60J 10/083 296/209 |
| 2013/0038090 A1 | * | 2/2013 | Hwang | B60R 13/0876 296/193.07 |

FOREIGN PATENT DOCUMENTS

| | | |
|---|---|---|
| JP | 2012-166710 | 9/2012 |
| JP | 2015-54644 | 3/2015 |

* cited by examiner

*Primary Examiner* — Dennis H Pedder
(74) *Attorney, Agent, or Firm* — Oblon, McClelland, Maier & Neustadt, L.L.P.

(57) ABSTRACT

There is provided a vehicle floor portion structure having: a floor panel; a tunnel portion that projects-out toward a vehicle upper side at a vehicle transverse direction central portion of the floor panel; a cross member that is bridged, along a vehicle transverse direction, between the tunnel portion and a rocker that is at a vehicle transverse direction outer side of the floor panel; a bracket that is disposed so as to be apart from the cross member in a vehicle longitudinal direction, and whose bottom portion is fixed to the floor panel, and whose side portion is fixed to a side wall portion of the tunnel portion or the rocker, and a seat is fixed to the bracket; and a reinforcement that is provided at an upper portion of the tunnel portion or the rocker, and to which an upper portion of the bracket is joined.

5 Claims, 8 Drawing Sheets

VEHICLE FLOOR PORTION STRUCTURE

CROSS-REFERENCE TO RELATED APPLICATION

This application is based upon and claims the benefit of priority of the prior Japanese Patent Application No. 2015-205882 filed on Oct. 19, 2015, the entire contents of which are incorporated herein by reference.

FIELD

The embodiments discussed herein are related to a vehicle floor portion structure.

BACKGROUND

Patent Document 1 (Japanese Patent Application Laid-Open (JP-A) No. 2015-054644) discloses, in a vehicle lower portion structure that has brackets that fix seats, a structure in which the bottom portion of a bracket is fixed to the floor panel, and the side portion of the bracket is fixed to the side wall of the tunnel portion or the side wall of a rocker (side sill). Note that the structure disclosed in Patent Document 2 (JP-A No. 2012-166710) exists as a vehicle floor structure that is equipped with an on-tunnel reinforcement on the upper portion of the tunnel portion.

In the structure disclosed in aforementioned Patent Document 1 (JP-A No. 2015-054644), the bottom portion of the bracket is fixed to the floor panel, and the seat is fixed by the brackets. In this structure, there is the possibility that stress may concentrate at the joined portions (the fixed places) of the brackets and the floor panel in a case in which load from the passenger is transmitted to the brackets at the time of a front collision, as compared with, for example, a structure in which the brackets are provided on a cross member that is bridged between the tunnel portion and a rocker.

In view of the above-described circumstances, an object of the present invention is to provide a vehicle floor portion structure that can suppress a concentration of stress at the joined portion of a bracket and a floor panel at the time of a front collision of a vehicle.

SUMMARY

A vehicle floor portion structure of a first aspect includes: a floor panel that structures a floor portion of a vehicle; a tunnel portion that extends in a vehicle longitudinal direction at a vehicle transverse direction central portion of the floor panel, and that projects-out toward a vehicle vertical direction upper side; a cross member that is bridged, along a vehicle transverse direction, between the tunnel portion and a rocker that extends in the vehicle longitudinal direction at a vehicle transverse direction outer side of the floor panel; a bracket that is disposed so as to be apart from the cross member in the vehicle longitudinal direction, and whose bottom portion is fixed to the floor panel, and whose side portion is fixed to a side wall portion of the tunnel portion or a side wall portion of the rocker, and a length, in the vehicle longitudinal direction, between a front wall and a rear wall at a bottom portion side of the bracket is structured to be longer than a length, in the vehicle longitudinal direction, between the front wall and the rear wall at an upper portion side of the bracket, and the bracket being configured to be fixed to a seat; and a reinforcement that is provided at an upper portion of the tunnel portion or the rocker, and to which an upper portion of the bracket is joined.

In accordance with the vehicle floor portion structure of the first aspect, the cross member is bridged along the vehicle transverse direction between the tunnel portion, that extends in the vehicle longitudinal direction at the vehicle transverse direction central portion of the floor panel, and the rocker, that extends in the vehicle longitudinal direction at the vehicle transverse direction outer side of the floor panel. The bracket to which the seat is fixed is disposed so as to be apart from the cross member in the vehicle longitudinal direction. The bottom portion of the bracket is fixed to the floor panel, and the side portion of the bracket is fixed to a side wall portion at the tunnel portion or the rocker. Moreover, the length, in the vehicle longitudinal direction, between the front wall and the rear wall at the bottom portion side of the bracket is structured to be longer than the length, in the vehicle longitudinal direction, between the front wall and the rear wall at the upper portion side of the bracket. In this vehicle floor portion structure, the joined portion (joined place) of the floor panel and the bottom portion of the bracket is long in the vehicle longitudinal direction, as compared with a structure in which the length, in the vehicle longitudinal direction, between the front wall and the rear wall at the bottom portion side of the bracket is the same as or shorter than the length, in the vehicle longitudinal direction, between the front wall and the rear wall at the upper portion side of the bracket. Further, the reinforcement is provided at the upper portion of the tunnel portion or the rocker, and the upper portion of the bracket is joined to the reinforcement. Therefore, when load from the passenger is transmitted to the bracket at the time of a front collision of the vehicle, a concentration of stress at the joined portion of the floor panel and the bottom portion of the bracket is suppressed. Further, due to the upper portion of the bracket being joined to the reinforcement that is provided at the upper portion of the tunnel portion or the rocker, load from the passenger is transmitted to the reinforcement at the time of a front collision of the vehicle, and load can be dispersed more effectively.

In a vehicle floor portion structure of a second aspect, in the vehicle floor portion structure of the first aspect, the upper portion of the bracket is joined to a position that extends over a ridgeline portion that is a border between a side wall portion and an upper wall portion at the tunnel portion or the rocker.

In accordance with the vehicle floor portion structure of the second aspect, the upper portion of the bracket is joined to a position that extends over the ridgeline portion that is the border between the side wall portion and the upper wall portion at the tunnel portion or the rocker. Due thereto, at the time of a front collision of the vehicle, load from the passenger is transmitted to a position that extends over the ridgeline portion that is the border between the side wall portion and the upper wall portion at the tunnel portion or the rocker. Therefore, load can be dispersed to the ridgeline portion where stiffness is high, at the tunnel portion or the rocker.

In a vehicle floor portion structure of a third aspect, in the vehicle floor portion structure of the first aspect, the reinforcement is an on-tunnel reinforcement that is provided at an upper portion of the tunnel portion, the side portion of the bracket is joined to a side wall portion of the tunnel portion, and the upper portion of the bracket is joined to the on-tunnel reinforcement.

In accordance with the vehicle floor portion structure of the third aspect, the on-tunnel reinforcement is provided at the upper portion of the tunnel portion, and the side portion of the bracket is joined to the side wall portion of the tunnel portion, and the upper portion of the bracket is joined to the on-tunnel reinforcement. Due thereto, load can be dispersed more effectively due to load from the passenger being transmitted from the bracket to the on-tunnel reinforcement at the time of a front collision of the vehicle.

In a vehicle floor portion structure of a fourth aspect, in the vehicle floor portion structure of the first aspect, the reinforcement is an on-rocker reinforcement that is provided at an upper portion of the rocker, the side portion of the bracket is joined to a side wall portion of the rocker, and the upper portion of the bracket is joined to the on-rocker reinforcement.

In accordance with the vehicle floor portion structure of the fourth aspect, the on-rocker reinforcement is provided at the upper portion of the rocker, and the side portion of the bracket is joined to the side wall portion of the rocker, and the upper portion of the bracket is joined to the on-rocker reinforcement. Due thereto, load can be dispersed more effectively due to load from the passenger being transmitted from the bracket to the on-rocker reinforcement at the time of a front collision of the vehicle.

In accordance with the vehicle floor portion structure relating to the present invention, at the time of a front collision of the vehicle, a concentration of stress at the joined portions of the bracket and the floor panel can be suppressed.

DESCRIPTION OF EMBODIMENTS

Vehicle floor portion structures relating to embodiments of the present invention are described on the basis of the drawings. Note that arrow FR, arrow UP, arrow RH and arrow LH that are shown appropriately in the respective drawings indicate the forward direction, the upward direction, the rightward direction and the leftward direction of a vehicle to which the vehicle floor portion structures relating to the embodiments of the present invention are applied, respectively. Hereinafter, when description is given by using merely longitudinal, vertical and left-right directions, they refer to the longitudinal of the vehicle longitudinal direction, the vertical of the vehicle vertical direction, and the left-right in a case of facing in the forward direction, unless otherwise stated.

Figure 1:
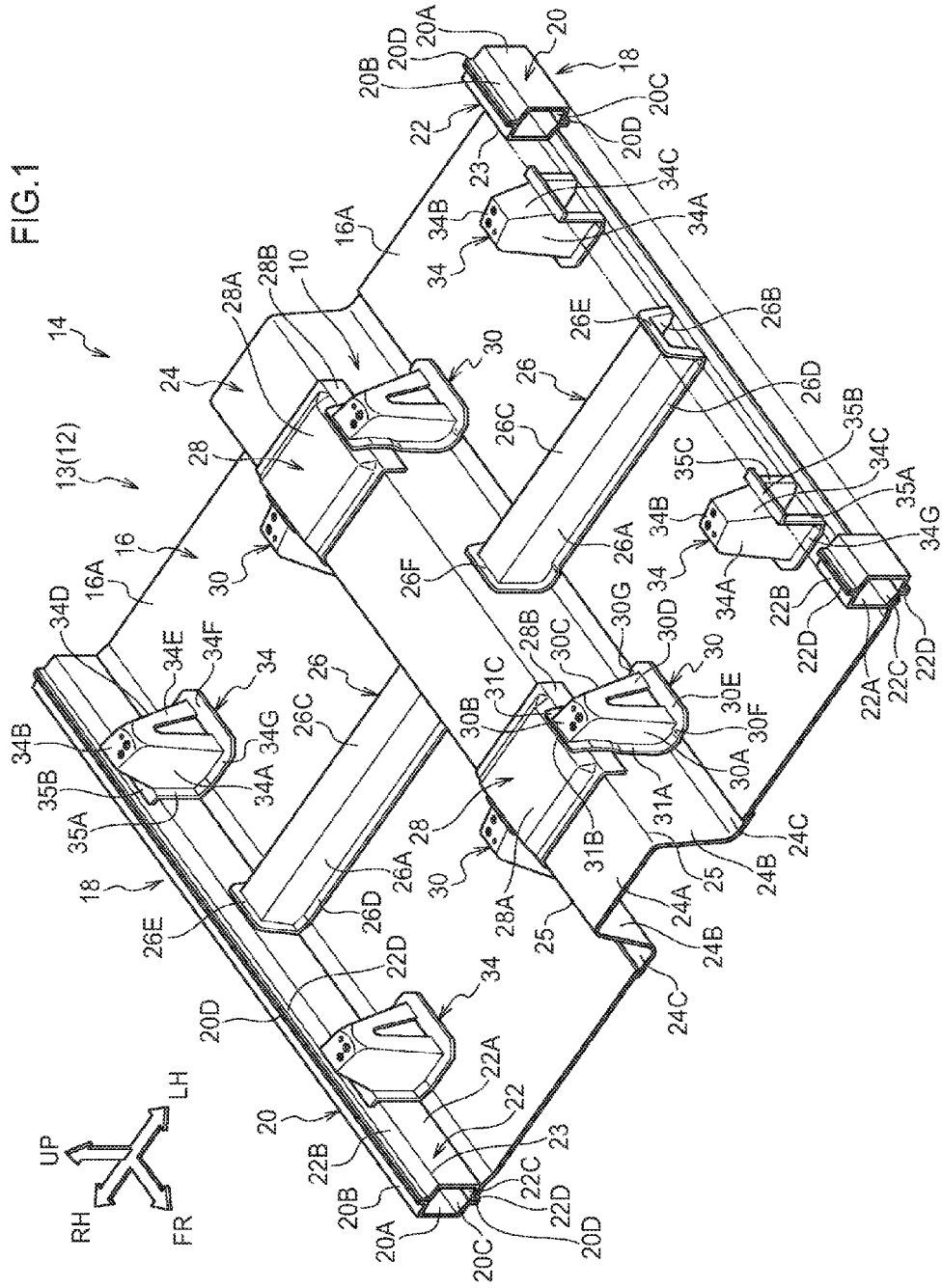
FIG. 1 is a perspective view showing a vehicle floor portion structure relating to a first embodiment.

A first embodiment of a vehicle floor portion structure relating to the present invention is described by using FIG. 1 through FIG. 5. A vehicle floor portion structure 10 of the present embodiment is shown in a perspective view in FIG. 1. As shown in FIG. 1, the vehicle floor portion structure 10 of the present embodiment is applied to a lower portion 13 of a vehicle 12. A floor panel 16 that structures the floor portion of a vehicle cabin 14 is provided at the lower portion 13 of the vehicle 12.

Rockers 18, 18, that respectively extend substantially along the vehicle longitudinal direction, are provided at the outer sides in the vehicle transverse direction (the both end portions in the vehicle transverse direction) of the floor panel 16. As seen in a vehicle front view, the rockers 18, 18 are formed symmetrically to the left and the right. The rockers 18, 18 are structured to include rocker outer panels 20 that are disposed at the outer sides in the vehicle transverse direction, and rocker inner panels 22 that are disposed at the vehicle transverse direction inner sides.

In a cross-section that is cut along the vehicle transverse direction, the rocker outer panel 20 and the rocker inner panel 22 are formed in substantial hat shapes whose sides that face one another are open. More concretely, the rocker outer panel 20 has a side wall portion 20A that is disposed substantially along the vehicle vertical direction, an upper wall portion 20B that extends from the upper end portion of the side wall portion 20A substantially toward the vehicle transverse direction inner side, and a lower wall portion 20C that extends from the lower end portion of the side wall portion 20A substantially toward the vehicle transverse direction inner side. A pair of upper and lower flange portions 20D jut-out substantially along the vehicle vertical direction respectively from the vehicle transverse direction inner side end portions of the upper wall portion 20B and the lower wall portion 20C of the rocker outer panel 20.

The rocker inner panel 22 has a side wall portion 22A that is disposed substantially along the vehicle vertical direction, an upper wall portion 22B that serves as an upper portion and extends from the upper end portion of the side wall portion 22A substantially toward the vehicle transverse direction outer side, and a lower wall portion 22C that extends from the lower end portion of the side wall portion 22A substantially toward the vehicle transverse direction outer side. A pair of upper and lower flange portions 22D jut-out substantially along the vehicle vertical direction respectively from the vehicle transverse direction outer side end portions of the upper wall portion 22B and the lower wall portion 22C of the rocker inner panel 22. The rockers 18, 18 are each made to be a closed cross-sectional structure that extends substantially in the vehicle longitudinal direction, due to the upper and lower pairs of flange portions 20D, 22D of the rocker outer panels 20 and the rocker inner panels 22 being joined together by welding or the like.

Here, the floor panel 16 is divided at the left and the right of the vehicle 12, and is structured by a pair of floor panels 16A, 16A. A tunnel portion 24 that extends substantially along the vehicle longitudinal direction is provided at the vehicle transverse direction central portion of the floor panel 16 (between the floor panel 16A and the floor panel 16A). The tunnel portion 24 projects-out from the floor panel 16 toward the upper side in the vehicle vertical direction.

Concretely, in a cross-section cut along the vehicle transverse direction, the tunnel portion 24 is formed in a substantial hat shape that opens toward the vehicle lower side. The tunnel portion 24 has an upper wall portion 24A that serves as an upper portion and extends substantially in the vehicle longitudinal direction and substantially in the vehicle transverse direction, and a pair of side wall portions 24B, 24B that are positioned at the left and right of the upper wall portion 24A. Moreover, the tunnel portion 24 has a pair of flange portions 24C, 24C that are bent toward the vehicle transverse direction outer sides from the lower end portions of the side wall portions 24B, 24B.

The pair of side wall portions 24B, 24B are inclined wall portions that are respectively inclined toward the outer sides in the vehicle transverse direction, while heading from the vehicle transverse direction outer side end portions of the upper wall portion 24A toward the lower side. The flange portions 24C, 24C are respectively joined by welding or the like to the lower surfaces of the floor panels 16A at the vehicle transverse direction both sides. Due thereto, the floor panels 16A at the vehicle transverse direction both sides and the tunnel portion 24 are made integral. Further, the floor panels 16A at the vehicle transverse direction both sides and the tunnel portion 24 may be formed integrally.

The lower wall portion 22C of the rocker inner panel 22 of the rocker 18 is joined to the top surface of the vehicle transverse direction outer side end portion of the floor panel 16A. Due thereto, the floor panel 16A and the rocker 18 are made integral at the vehicle transverse direction outer side end portion.

Cross members 26, 26 are respectively provided on the top surfaces of the floor panels 16A with the tunnel portion 24 therebetween. As seen in a vehicle front view, the cross members 26, 26 at the vehicle transverse direction both sides of the tunnel portion 24 are formed symmetrically to the left and the right.

The cross members 26 are bridged substantially along the vehicle transverse direction between the tunnel portion 24 and the rockers 18, and a plurality thereof are disposed along the vehicle longitudinal direction (although only one is illustrated in the drawings). In a cross-section cut along the vehicle longitudinal direction, the cross members 26 are formed in substantial hat shapes that open toward the vehicle lower side.

Concretely, the cross member 26 is structured to include a front wall portion 26A that is disposed at the front side in the vehicle longitudinal direction, a rear wall portion 26B that is disposed at the rear side in the vehicle longitudinal direction so as to face the front wall portion 26A, and an upper wall portion 26C that joins the upper end portion of the front wall portion 26A and the upper end portion of the rear wall portion 26B. Further, the cross member 26 has a front flange portion 26D that is bent toward the vehicle front side from the lower end portion of the front wall portion 26A, and a rear flange portion (not illustrated) that is bent toward the vehicle rear side from the lower end portion of the rear wall portion 26B. Further, the front flange portion 26D and the rear flange portion are respectively joined by welding or the like to the top surface of the floor panel 16A. Due thereto, a closed cross-section is structured by the cross member 26 and the floor panel 16A.

A bent portion 26E, that is bent toward the outer sides of the cross-section of the cross member 26 from the vehicle transverse direction outer side end portions of the front wall portion 26A and the upper wall portion 26C and the rear wall portion 26B, is provided at the rocker 18 side of the cross member 26. The bent portion 26E is connected to the front flange portion 26D and the rear flange portion (not illustrated). The bent portion 26E is joined by welding or the like to the side wall portion 22A of the rocker inner panel 22.

A bent portion 26F, that is bent toward the outer sides of the cross-section of the cross member 26 from the vehicle transverse direction inner side end portions of the front wall portion 26A and the upper wall portion 26C and the rear wall portion 26B, is provided at the tunnel portion 24 side of the cross member 26. The bent portion 26F is omitted at the cross member 26 at the vehicle transverse direction right side (not illustrated). The bent portion 26F is connected to the front flange portion 26D and the rear flange portion (not illustrated). The bent portion 26F is joined by welding or the like to the side wall portion 24B of the tunnel portion 24.

Figure 2:
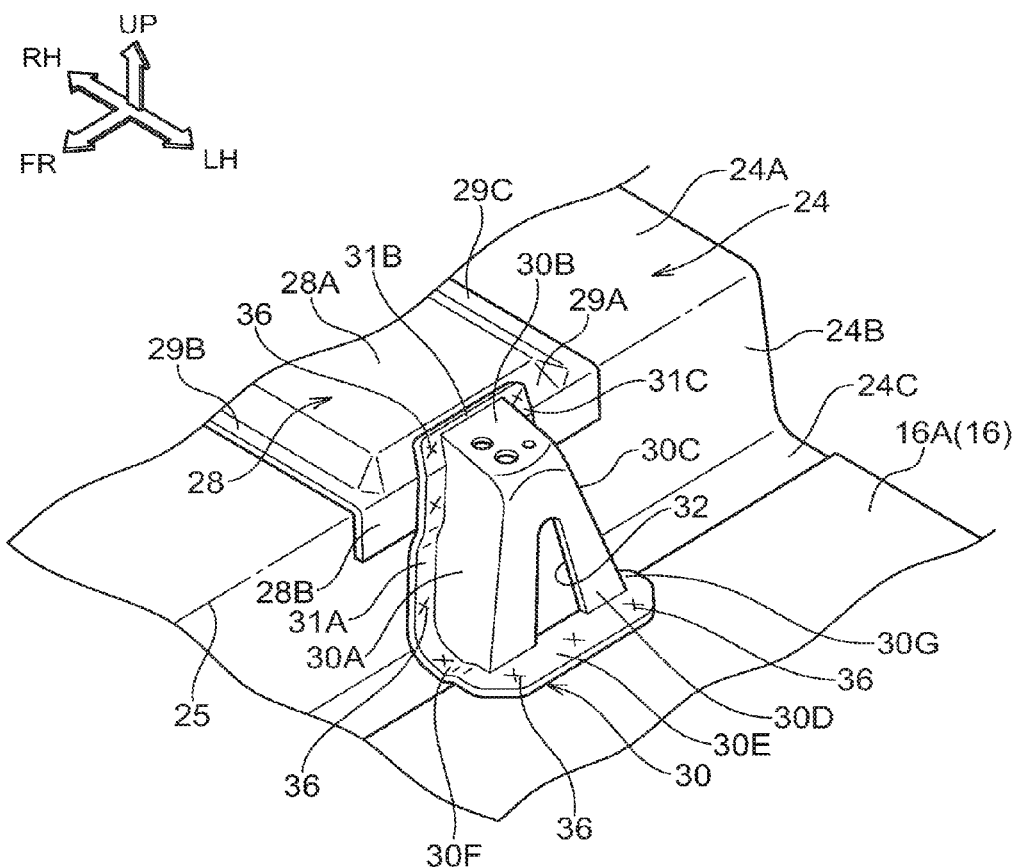
FIG. 2 is a perspective view showing the vicinity of a bracket that is joined to a tunnel portion side and is used in the vehicle floor portion structure shown in FIG. 1.

On-tunnel reinforcements 28 that serve as reinforcements are joined to the upper portion of the tunnel portion 24 at positions that are apart from the cross members 26 in the vehicle longitudinal direction. In the present embodiment, two of the on-tunnel reinforcements 28 are provided at positions that are apart at the vehicle front side and the vehicle rear side of the cross members 26. The two on-tunnel reinforcements 28 have substantially the same structures. In a cross-section cut along the vehicle transverse direction, the on-tunnel reinforcement 28 is formed substantially in an upside-down U-shape that opens toward the vehicle lower side. As shown in FIG. 1 and FIG. 2, the on-tunnel reinforcement 28 has an upper wall portion 28A, and a pair of side wall portions 28B that are positioned at the left and the right of the upper wall portion 28A (the side surface portion at the vehicle transverse direction right side of the tunnel portion 24 is not illustrated).

Further, portions of the upper wall portion 28A of the on-tunnel reinforcement 28 abut the upper wall portion 24A of the tunnel portion 24, and portions of the pair of side wall portions 28B of the on-tunnel reinforcement 28 abut the pair of side wall portions 24B, 24B of the tunnel portion 24, respectively. As shown in FIG. 2, at the upper wall portion 28A of the on-tunnel reinforcement 28, the vehicle transverse direction central portion side bulges-out toward the upper side from the side wall portions 28B, and the upper wall portion 28A has, at the vehicle transverse direction both end portions of the upper wall portion 28A, inclined portions 29A that are inclined so as to be sloped upward toward the vehicle transverse direction central portion side. Due thereto, an unillustrated closed cross-sectional portion is formed between the upper wall portion 28A of the on-tunnel reinforcement 28 and the upper wall portion 24A of the tunnel portion 24.

The on-tunnel reinforcement 28 is disposed so as to cover the tunnel portion 24 from the outer side. Further, a front end portion 29B and a rear end portion 29C of the on-tunnel reinforcement 28 are disposed in states of planarly contacting the upper wall portion 24A of the tunnel portion 24, and the front end portion 29B and the rear end portion 29C of the on-tunnel reinforcement 28 are respectively joined by welding or the like to the upper wall portion 24A. Moreover, the pair of side wall portions 28B are disposed in states of planarly contacting the side wall portions 24B, 24B of the tunnel portion 24, and are respectively joined by welding or the like to the side wall portions 24B, 24B.

Note that an unillustrated parking brake is mounted to the upper wall portion 28A of the on-tunnel reinforcement 28 at the vehicle longitudinal direction front side.

As shown in FIG. 1, at the vehicle floor portion structure 10, plural brackets 30 are provided at positions, that are apart from the cross members 26 at the vehicle longitudinal direction front side and rear side, at the tunnel portion 24 sides (the both sides of the tunnel portion 24). Further, at the vehicle floor portion structure 10, plural brackets 34 are provided at positions, that are apart from the cross members 26 at the vehicle longitudinal direction front side and rear side, at the rocker 18 sides at the vehicle transverse direction both end portions. The brackets 30, 34 are seat brackets, and are members that fix and support seats 50 (see FIG. 5) on which passengers P sit. More concretely, there is a structure in which, at the vehicle transverse direction right side of the tunnel portion 24 within the vehicle cabin 14 as seen in a vehicle back view, one of the seats 50 is fixed by the two front and rear brackets 30 at the right side of the tunnel portion 24 and the two front and rear brackets 34 that are disposed at the rocker 18 side at the vehicle transverse direction right side. Similarly, there is a structure in which, at the vehicle transverse direction left side of the tunnel portion 24 within the vehicle cabin 14 as seen in a vehicle back view, another one of the seats 50 is fixed by the two front and rear brackets 30 at the left side of the tunnel portion 24 and the two front and rear brackets 34 that are disposed at the rocker 18 side at the vehicle transverse direction left side.

Figure 3:
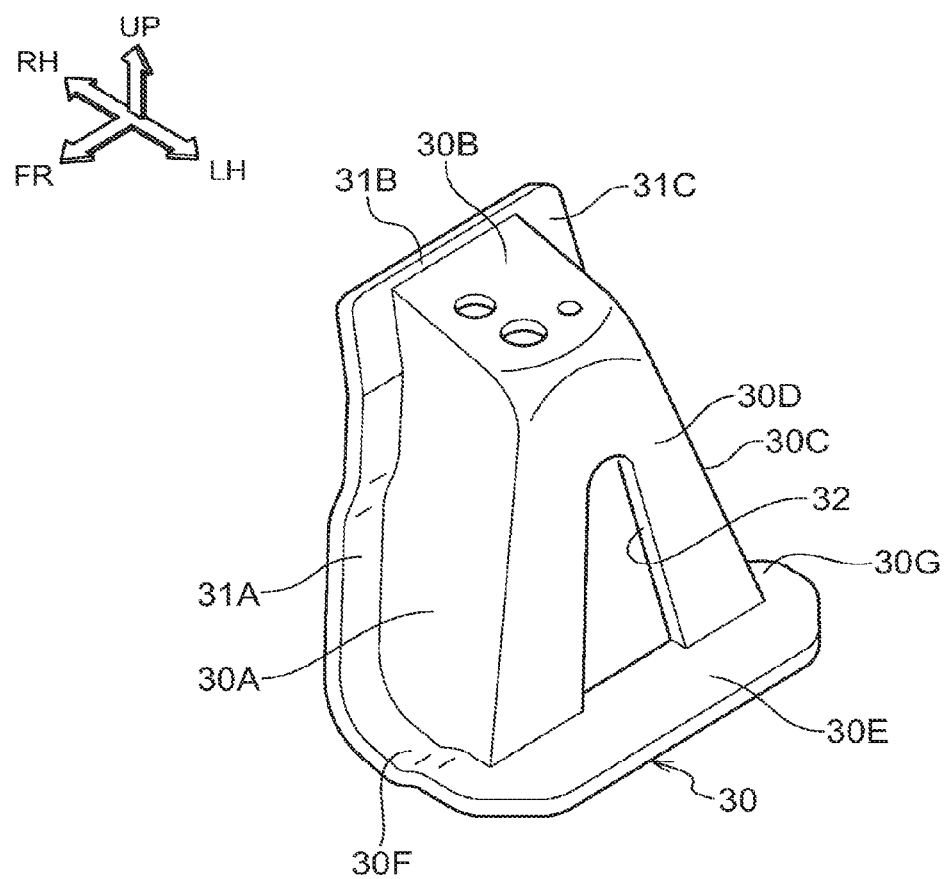
FIG. 3 is a perspective view showing the bracket alone that is joined to the tunnel portion side and is used in the vehicle floor portion structure shown in FIG. 1.

As shown in FIG. 1 through FIG. 3, the brackets 30 that are at the tunnel portion 24 side are formed in substantial box shapes whose vehicle transverse direction inner sides and vehicle vertical direction lower sides are open. The bracket 30 is formed so as to be substantially symmetrical to the front and the rear from a vehicle longitudinal direction central portion thereof as seen in a vehicle side view. More concretely, the bracket 30 has a front wall portion 30A that serves as a front wall and is disposed at the vehicle longitudinal direction front side, and an upper wall portion 30B that extends toward the vehicle rear side from the vehicle vertical direction upper end portion of the front wall portion 30A. Further, the bracket 30 has a rear wall portion 30C that serves as a rear wall, and extends toward the vehicle lower side from the vehicle longitudinal direction rear end portion of the upper wall portion 30B, and that is disposed so as to face the front wall portion 30A (in FIG. 1 through FIG. 3, only the ridgeline of the rear wall portion 30C is shown). Moreover, the bracket 30 has a side wall portion 30D that connects the front wall portion 30A, the upper wall portion 30B and the rear wall portion 30C, and that is disposed at the vehicle transverse direction outer side (the rocker 18 side). An opening portion 32 that is substantially triangular as seen in a vehicle side view is formed in the lower portion side of the vehicle longitudinal direction intermediate portion of the side wall portion 30D (see FIG. 2 and FIG. 3).

An outer flange portion 30E, that serves as the bottom portion and is bent toward the vehicle transverse direction outer side from the vehicle vertical direction lower end portion of the side wall portion 30D, and a lower flange portion 30F, that serves as the bottom portion and is bent toward the vehicle front side from the vehicle vertical direction lower end portion of the front wall portion 30A, are provided at the bracket 30. Further, a lower flange portion 30G, that serves as the bottom portion and is bent toward the vehicle rear side from the vehicle vertical direction lower end portion of the rear wall portion 30C, is provided at the bracket 30. The lower flange portion 30F and the outer flange portion 30E and the lower flange portion 30G are formed in continuation at the lower end portion of the bracket 30. Namely, the lower flange portion 30F and the outer flange portion 30E and the lower flange portion 30G are formed in a substantial U-shape as seen in a vehicle plan view. The lower flange portion 30F and the outer flange portion 30E and the lower flange portion 30G that serve as the bottom portion of the bracket 30 are fixed (joined) to the floor panel 16A (including the flange portion 24C at the lower portion of the tunnel portion 24) by joined portions 36 that are formed by spot welding (see FIG. 2).

Moreover, a front flange portion 31A, that serves as the side portion and is bent toward the vehicle front side from the vehicle transverse direction inner side end portion of the front wall portion 30A, and an upper flange portion 31B, that is bent toward the vehicle upper side from the vehicle transverse direction inner side end portion of the upper wall portion 30B, are provided at the bracket 30. Further, a rear flange portion 31C, that serves as the side portion and is bent toward the vehicle rear side from the vehicle transverse direction inner side end portion of the rear wall portion 30C, is provided at the bracket 30. The front flange portion 31A and the upper flange portion 31B and the rear flange portion 31C are formed in continuation at the side portion of the bracket 30. Namely, the front flange portion 31A and the upper flange portion 31B and the rear flange portion 31C are formed in a substantial U-shape as seen in a side view of the bracket 30. As shown in FIG. 2, the upper portions of the front flange portion 31A and the rear flange portion 31C are bent toward the vehicle transverse direction inner side along the inclined portion 29A from the side wall portion 28B of the on-tunnel reinforcement 28. The lower portion sides (the regions other than the upper portions) of the front flange portion 31A and the rear flange portion 31C of the bracket 30 are fixed (joined) to the side wall portion 24B of the tunnel portion 24 by the joined portions 36 that are formed by spot welding. Further, the upper portions of the front flange portion 31A and the rear flange portion 31C of the bracket 30 are fixed (joined), by the joined portions 36 that are formed by spot welding, to the side wall portion 28B and the inclined portion 29A of the on-tunnel reinforcement 28 that is fixed to the upper portion of the tunnel portion 24.

In the vehicle floor portion structure 10, the upper portions of the front flange portion 31A and the rear flange portion 31C of the bracket 30 are joined to positions that extend over a ridgeline portion 25 that is the border between the side wall portion 24B and the upper wall portion 24A at the tunnel portion 24. In the present embodiment, the side wall portion 28B and the upper wall portion 28A of the on-tunnel reinforcement 28 are disposed so as to extend over the ridgeline portion 25 of the tunnel portion 24, and the upper portions of the front flange portion 31A and the rear flange portion 31C of the bracket 30 are joined to the side wall portion 28B and the inclined portion 29A of the upper wall portion 28A.

In the present embodiment, the length, in the vehicle longitudinal direction, between the front wall portion 30A and the rear wall portion 30C at the bottom portion side (the lower flange portion 30F and the lower flange portion 30G side) of the bracket 30 is structured to be longer than the length, in the vehicle longitudinal direction, between the front wall portion 30A and the rear wall portion 30C at the upper portion side (the upper wall portion 30B side) of the bracket 30. For example, the length, in the vehicle longitudinal direction, between the front wall portion 30A and the rear wall portion 30C at the bottom portion side of the bracket 30 is set to be greater than or equal to approximately 1.4 times (in the present embodiment, greater than or equal to approximately 2 times) the length, in the vehicle longitudinal direction, between the front wall portion 30A and the rear wall portion 30C at the upper portion side of the bracket 30.

Figure 4:
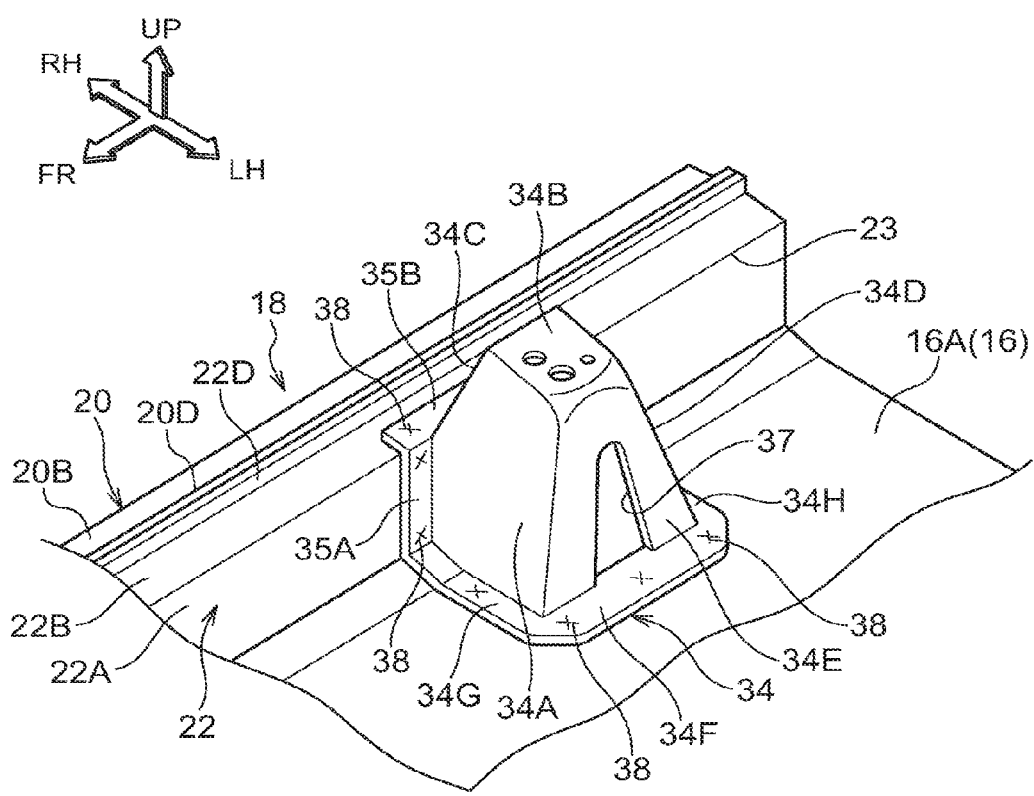
FIG. 4 is a perspective view showing the vicinity of a bracket that is joined to a rocker side and is used in the vehicle floor portion structure shown in FIG. 1.

As shown in FIG. 1 and FIG. 4, the bracket 34 at the rocker 18 side is formed substantially in the shape of a box whose vehicle transverse direction outer side and vehicle vertical direction lower side are open. The bracket 34 is formed so as to be substantially symmetrical to the front and the rear from a vehicle longitudinal direction central portion thereof as seen in a vehicle side view. More concretely, the bracket 34 has a front wall portion 34A that serves as a front wall and is disposed at the vehicle longitudinal direction front side, an upper wall portion 34B that extends toward the vehicle rear side from the vehicle vertical direction upper end portion of the front wall portion 34A, and an inclined portion 34C (see FIG. 1) that is inclined toward the vehicle transverse direction outer side and vehicle lower side from the vehicle transverse direction outer side end portion of the upper wall portion 34B. Further, the bracket 34 has a rear wall portion 34D that serves as a rear wall and extends toward the vehicle lower side from the vehicle longitudinal direction rear end portions of the upper wall portion 34B and the inclined portion 34C. Moreover, the bracket 30 has a side wall portion 34E that connects the front wall portion 34A, the upper wall portion 34B and the rear wall portion 34D, and that is disposed at the vehicle transverse direction inner side (the tunnel portion 24 side). An opening portion 37 that is substantially triangular as seen in a vehicle side view is formed in the lower portion side of the vehicle longitudinal direction intermediate portion of the side wall portion 34E.

An outer flange portion 34F, that serves as the bottom portion and is bent toward the vehicle transverse direction inner side from the vehicle vertical direction lower end portion of the side wall portion 34E, and a lower flange portion 34G that serves as the bottom portion and is bent toward the vehicle front side from the vehicle vertical direction lower end portion of the front wall portion 34A, are provided at the bracket 34. Further, a lower flange portion 34H that serves as the bottom portion and is bent toward the vehicle rear side from the vehicle vertical direction lower end portion of the rear wall portion 34D, is provided at the bracket 34. The lower flange portion 34G and the outer flange portion 34F and the lower flange portion 34H are formed in continuation at the lower end portion of the bracket 34. Namely, the lower flange portion 34G and the outer flange portion 34F and the lower flange portion 34H are formed in a substantial U-shape as seen in a vehicle plan view. The lower flange portion 34G and the outer flange portion 34F and the lower flange portion 34H that serve as the bottom portion of the bracket 34 are fixed (joined) to the floor panel 16A by joined portions 38 that are formed by spot welding.

A front flange portion 35A, that serves as the side portion and is bent toward the vehicle front side from the vehicle transverse direction outer side end portion of the front wall portion 34A, and an upper flange portion 35B, that serves as the upper portion and extends toward the vehicle transverse direction outer side from the vehicle transverse direction outer side end portion of the inclined portion 34C, are provided at the bracket 34. Further, a rear flange portion 35C, that serves as the side portion and is bent toward the vehicle rear side from the vehicle transverse direction outer side end portion of the rear wall portion 34D, is provided at the bracket 34 (see FIG. 1). The front flange portion 35A and the upper flange portion 35B and the rear flange portion 35C are formed in continuation at the vehicle transverse direction outer side end portion of the bracket 34. The front flange portion 35A and the rear flange portion 35C of the bracket 34 are fixed (joined) by the joined portions 38 that are formed by spot welding, to the side wall portion 22A of the rocker inner panel 22 of the rocker 18 (see FIG. 4). Further, the upper flange portion 35B of the bracket 34 is fixed (joined) by the joined portions 38 that are formed by spot welding, to the upper wall portion 22B of the rocker inner panel 22 at the rocker 18 (see FIG. 4).

In the vehicle floor portion structure 10, the front flange portion 35A, the rear flange portion 35C and the upper flange portion 35B of the bracket 34 are joined to positions that extend over a ridgeline portion 23 that is the border between the side wall portion 22A and the upper wall portion 22B at the rocker inner panel 22 of the rocker 18.

In the present embodiment, the length, in the vehicle longitudinal direction, between the front wall portion 34A and the rear wall portion 34D at the bottom portion side (the lower flange portion 34G and the lower flange portion 34H side) of the bracket 34 is structured to be longer than the length, in the vehicle longitudinal direction, between the front wall portion 34A and the rear wall portion 34D at the upper portion side (the upper wall portion 34B side) of the bracket 34. For example, the length, in the vehicle longitudinal direction, between the front wall portion 34A and the rear wall portion 34D at the bottom portion side of the bracket 34 is set to be greater than or equal to approximately 1.4 times (in the present embodiment, greater than or equal to approximately 2 times) the length, in the vehicle longitudinal direction, between the front wall portion 34A and the rear wall portion 34D at the upper portion side of the bracket 34.

Moreover, in the present embodiment the length, in the vehicle transverse direction, of the front wall portion 34A at the bottom portion side (the lower flange portion 34G side) of the bracket 34 is structured to be longer than the length, in the vehicle transverse direction, of the front wall portion 34A at the upper portion side (the upper wall portion 34B side) of the bracket 34. Similarly, the length, in the vehicle transverse direction, of the rear wall portion 34D at the bottom portion side (the lower flange portion 34H side) of the bracket 34 is structured to be longer than the length, in the vehicle transverse direction, of the rear wall portion 34D at the upper portion side (the upper wall portion 34B side) of the bracket 34.

Operation and effects of the vehicle floor portion structure 10 of the present embodiment are described next.

As shown in FIG. 1 and the like, the floor panel 16 that structures the floor portion of the vehicle 12, and the tunnel portion 24, that extends in the vehicle longitudinal direction at the vehicle transverse direction central portion of the floor panel 16 and projects-out toward the vehicle vertical direction upper side, are provided at the lower portion 13 of the vehicle 12. The rockers 18, 18 that extend substantially in the vehicle longitudinal direction are provided at the vehicle transverse direction outer sides of the floor panel 16. The cross members 26 that are bridged along the vehicle transverse direction are provided between the rockers 18, 18 and the tunnel portion 24 on the floor panel 16. The brackets 30, that are disposed so as to be apart from the cross members 26 at the front side and the rear side in the vehicle longitudinal direction, are provided at the tunnel portion 24 side of the lower portion 13 of the vehicle 12. Further, the brackets 34, that are disposed so as to be apart from the cross members 26 at the front side and the rear side in the vehicle longitudinal direction, are provided at the rocker 18 sides of the lower portion 13 of the vehicle 12. The seat 50 (see FIG. 5) is fixed to the two brackets 30 and the two brackets 34 that are at the vehicle transverse direction left side of the tunnel portion 24. Similarly, the other seat 50 (see FIG. 5) is fixed to the two brackets 30 and the two brackets 34 that are at the vehicle transverse direction right side of the tunnel portion 24.

As shown in FIG. 2, the lower flange portion 30F and the outer flange portion 30E and the lower flange portion 30G that serve as the bottom portion of the bracket 30 are fixed to the floor panel 16A by the joined portions 36. The lower portion sides of the front flange portion 31A and the rear flange portion 31C that serve as the side portion of the bracket 30 are fixed to the side wall portion 24B of the tunnel portion 24 by the joined portions 36. Moreover, the upper portions of the front flange portion 31A and the rear flange portion 31C of the bracket 30 are fixed by the joined portions 36 to the on-tunnel reinforcement 28 that is fixed to the upper wall portion 24A and the upper portions of the side wall portions 24B of the tunnel portion 24. The length, in the vehicle longitudinal direction, between the front wall portion 30A and the rear wall portion 30C at the bottom portion side (the lower flange portion 30F and the lower flange portion 30G side) of the bracket 30 is structured to be longer than the length, in the vehicle longitudinal direction, between the front wall portion 30A and the rear wall portion 30C at the upper portion side (the upper wall portion 30B side) of the bracket 30.

As shown in FIG. 4, the lower flange portion 34G and the outer flange portion 34F and the lower flange portion 34H that serve as the bottom portion of the bracket 34 are fixed to the floor panel 16A by the joined portions 38. The front flange portion 35A and the rear flange portion 35C of the bracket 34 (see FIG. 1) are fixed by the joined portions 38 to the side wall portion 22A of the rocker inner panel 22 at the rocker 18. Moreover, the upper flange portion 35B of the bracket 34 is fixed by the joined portions 38 to the upper wall portion 22B of the rocker inner panel 22 at the rocker 18. The length, in the vehicle longitudinal direction, between the front wall portion 34A and the rear wall portion 34D at the bottom portion side (the lower flange portion 34G and the lower flange portion 34H side) of the bracket 34 is structured to be longer than the length, in the vehicle longitudinal direction, between the front wall portion 34A and the rear wall portion 34D at the upper portion side (the upper wall portion 34B side) of the bracket 34.

In the vehicle floor portion structure 10, the joined portion (joined place) of the floor panel 16A and the lower flange portion 30F and the outer flange portion 30E and the lower flange portion 30G of the bracket 30 at the tunnel portion 24 side is long in the vehicle longitudinal direction, as compared with a structure in which the length, in the vehicle longitudinal direction, between the front wall portion and the rear wall portion at the bottom portion side of the bracket at the tunnel portion 24 side is substantially the same as or shorter than the length, in the vehicle longitudinal direction, between the front wall portion and the rear wall portion at the upper portion side of the bracket. Similarly, at the vehicle floor portion structure 10, the joined portion (joined place) of the floor panel 16A and the lower flange portion 34G and the outer flange portion 34F and the lower flange portion 34H of the bracket 34 at the rocker 18 side is long in the vehicle longitudinal direction, as compared with a structure in which the length, in the vehicle longitudinal direction, between the front wall portion and the rear wall portion at the bottom portion side of the bracket at the rocker 18 side is substantially the same as or shorter than the length, in the vehicle longitudinal direction, between the front wall portion and the rear wall portion at the upper portion side of the bracket.

Figure 5:
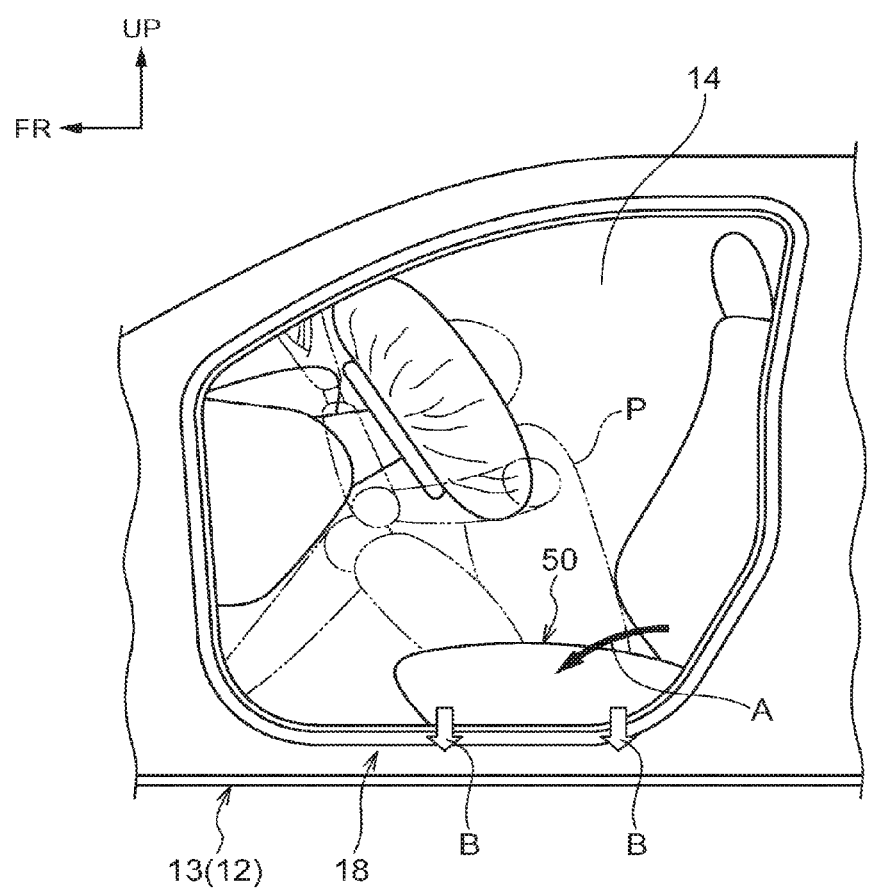
FIG. 5 is a side view for explaining the direction of load that is applied to the brackets from a passenger seated in a seat at the time of a front collision of a vehicle.

As shown in FIG. 5, at the time of a front collision of the vehicle 12, load toward the vehicle lower side that is shown by arrows B is applied from the passenger P to the brackets 30, 34 (see FIG. 1) that fix the seat 50, due to the behavior shown by arrow A of the lumbar region of the passenger P who is seated in the seat 50 (the movement of the lumbar region toward a vehicle obliquely front and lower side). In the vehicle floor portion structure 10 of the present embodiment, as described above, there is a structure in which the joined portions (the joined places) of the floor panel 16A and the bottom portions of the brackets 30, 34 are long in the vehicle longitudinal direction. Therefore, when load from the passenger P is transmitted to the brackets 30, 34 at the time of a front collision of the vehicle 12, a concentration of stress at the joined portions (joined places) of the floor panel 16A and the bottom portions of the brackets 30, 34 can be suppressed.

Further, in the vehicle floor portion structure 10, the on-tunnel reinforcement 28 is fixed to the upper portion of the tunnel portion 24, and the upper portions of the front flange portion 31A and the rear flange portion 31C of the bracket 30 are joined by the joined portions 36 to the on-tunnel reinforcement 28. Due thereto, at the time of a front collision of the vehicle 12, due to load from the passenger P being transmitted to the on-tunnel reinforcement 28, load can be dispersed more effectively.

Further, in the vehicle floor portion structure 10, the upper portions of the front flange portion 31A and the rear flange portion 31C of the bracket 30 are joined to positions that extend over the ridgeline portion 25 that is the border between the side wall portion 24B and the upper wall portion 24A at the tunnel portion 24. Due thereto, at the time of a front collision of the vehicle 12, load from the passenger P is transmitted to positions that extend over the ridgeline portion 25 that is the border between the side wall portion 24B and the upper wall portion 24A at the tunnel portion 24, and, due thereto, load can be dispersed to the ridgeline portion 25 where the stiffness is high at the tunnel portion 24. Similarly, at the vehicle front portion structure 10, the upper portions of the front flange portion 35A and the rear flange portion 35C, and the upper flange portion 35B, of the bracket 34 are joined to positions that extend over the ridgeline portion 23 that is the border between the side wall portion 22A and the upper wall portion 22B at the rocker inner panel 22 at the rocker 18. Due thereto, at the time of a front collision of the vehicle 12, load from the passenger P is transmitted to positions that extend over the ridgeline portion 23 that is the border between the side wall portion 22A and the upper wall portion 22B at the rocker 18, and, due thereto, load can be dispersed to the ridgeline portion 23 where the stiffness is high at the rocker 18.

Moreover, at the vehicle floor portion structure 10, the on-tunnel reinforcement 28 is provided at the upper portion of the tunnel portion 24. The lower portion sides of the front flange portion 31A and the rear flange portion 31C of the bracket 30 are joined to the side wall portion 24B of the tunnel portion 24, and the upper portions of the front flange portion 31A and the rear flange portion 31C of the bracket 30 are joined to the on-tunnel reinforcement 28. Due thereto, due to load from the passenger P being transmitted to the on-tunnel reinforcement 28 at the time of a front collision of the vehicle 12, load can be dispersed more effectively.

Still further, at the vehicle floor portion structure 10, the lengths, in the vehicle transverse direction, of the front wall portion 34A and the rear wall portion 34D at the bottom portion side (the lower flange portion 34G and the lower flange portion 34H side) of the bracket 34 are structured to be longer than the lengths, in the vehicle transverse direction, of the front wall portion 34A and the rear wall portion 34D at the upper portion side (the upper wall portion 34B side) of the bracket 34. Due thereto, when load from the passenger P is transmitted to the bracket 34 at the time of a front collision of the vehicle 12, a concentration of stress at the joined portion (joined place) of the floor panel 16A and the bottom portion of the bracket 34 can be suppressed more effectively. Together therewith, also at the time of a side collision of the vehicle 12, a concentration of stress at the joined portion (joined place) of the floor panel 16A and the bottom portion of the bracket 34 can be suppressed.

Figure 8:
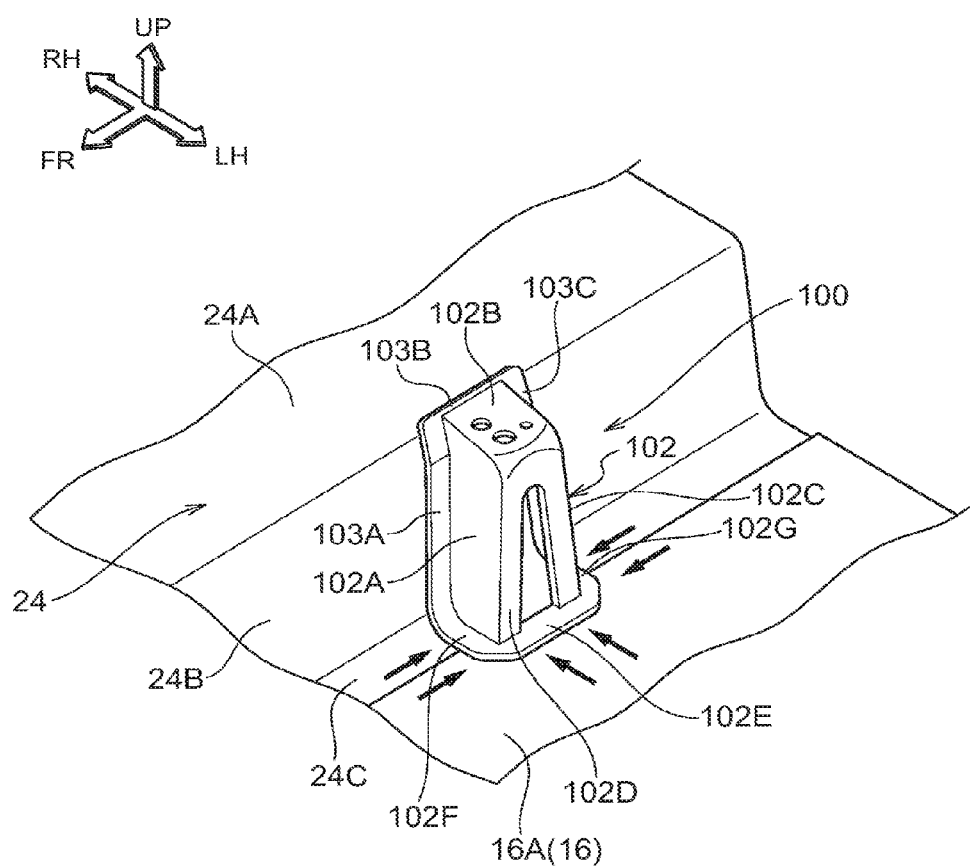
FIG. 8 is a perspective view showing the vicinity of a bracket that is joined to the tunnel portion side and is used in a vehicle floor portion structure of a comparative example.

A bracket 102 at the tunnel portion 24 side that is used in a vehicle floor portion structure 100 of a comparative example is shown in a perspective view in FIG. 8. As shown in FIG. 8, the bracket 102 has a front wall portion 102A at the front side in the vehicle longitudinal direction, an upper wall portion 102B at the upper side in the vehicle vertical direction, a rear wall portion 102C at the rear side in the vehicle longitudinal direction, and a side wall portion 102D at the vehicle transverse direction outer side.

An outer flange portion 102E that is bent toward the vehicle transverse direction outer side from the lower end portion of the side wall portion 102D, a lower flange portion 102F that is bent toward the vehicle front side from the lower end portion of the front wall portion 102A, and a lower flange portion 102G that is bent toward the vehicle rear side from the lower end portion of the rear wall portion 102C, are provided at the bracket 102. The lower flange portion 102F and the outer flange portion 102E and the lower flange portion 102G are formed in continuation at the lower end portion of the bracket 102, and are fixed to the floor panel 16A (including the flange portion 24C of the tunnel portion 24) by joined portions (not illustrated) that are formed by spot welding.

A front flange portion 103A that is bent toward the vehicle front side from the vehicle transverse direction inner side end portion of the front wall portion 102A, and an upper flange portion 103B that is bent toward the vehicle upper side from the vehicle transverse direction inner side end portion of the upper wall portion 102B, are provided at the bracket 102. Further, a rear flange portion 103C, that is bent toward the vehicle rear side from the vehicle transverse direction inner side end portion of the rear wall portion 102C, is provided at the bracket 102. The front flange portion 103A and the upper flange portion 103B and the rear flange portion 103C are formed in continuation at the side portion of the bracket 102. The front flange portion 103A and the rear flange portion 103C are fixed to the side wall portion 24B of the tunnel portion 24 by joined portions (not shown) that are formed by spot welding.

As compared with the bracket 30 (see FIG. 1 and FIG. 2) of the vehicle floor portion structure 10, at the bracket 102, the length, in the vehicle longitudinal direction, between the front wall portion 102A and the rear wall portion 102C at the bottom portion side (the lower flange portion 102F and the lower flange portion 102G side) of the bracket 102 is structured to be substantially the same as or slightly longer than the length, in the vehicle longitudinal direction, between the front wall portion 102A and the rear wall portion 102C at the upper portion side (the upper wall portion 102B side) of the bracket 102. For example, at the bracket 30 of the present embodiment (see FIG. 1 and FIG. 2), the length, in the vehicle longitudinal direction, between the front wall portion 30A and the rear wall portion 30C at the bottom portion side (the lower flange portion 30F and the lower flange portion 30G side) of the bracket 30 is set to be greater than or equal to approximately 1.4 times the length, in the vehicle longitudinal direction, between the front wall portion 102A and the rear wall portion 102C at the bottom portion side (the lower flange portion 102F and the lower flange portion 102G side) of the bracket 102 of the comparative example. Namely, at the bracket 102 of the comparative example, the difference between the length in the vehicle longitudinal direction between the front wall portion 102A and the rear wall portion 102C at the bottom portion side of the bracket 102, and the length in the vehicle longitudinal direction between the front wall portion 102A and the rear wall portion 102C at the upper portion side of the bracket 102, is quite small as compared with the bracket 30 of the present embodiment.

In the vehicle floor portion structure 100, when load from the passenger P is transmitted to the bracket 102 at the time of a front collision of the vehicle, there is the possibility that stress will concentrate at the joined portion (the joined place) of the floor panel 16A and the lower flange portion 102F and the outer flange portion 102E and the lower flange portion 102G of the bottom portion of the bracket 102.

In contrast, in the vehicle floor portion structure 10 of the present embodiment, the joined portion (joined place) of the floor panel 16A and the lower flange portion 30F and the outer flange portion 30E and the lower flange portion 30G that serve as the bottom portion of the bracket 30, is long in the vehicle longitudinal direction as compared with the bracket 102 of the comparative example. Similarly, the joined portion (joined place) of the floor panel 16A and the lower flange portion 34G and the outer flange portion 34F and the lower flange portion 34H, that serve as the bottom portion of the bracket 34 at the rocker 18 side, is long in the vehicle longitudinal direction. Therefore, when load from the passenger P is transmitted to the brackets 30, 34 at the time of a front collision of the vehicle 12, a concentration of stress at the joined portions (joined places) of the floor panel 16A and the bottom portions of the brackets 30, 34 can be suppressed.

Figure 6:
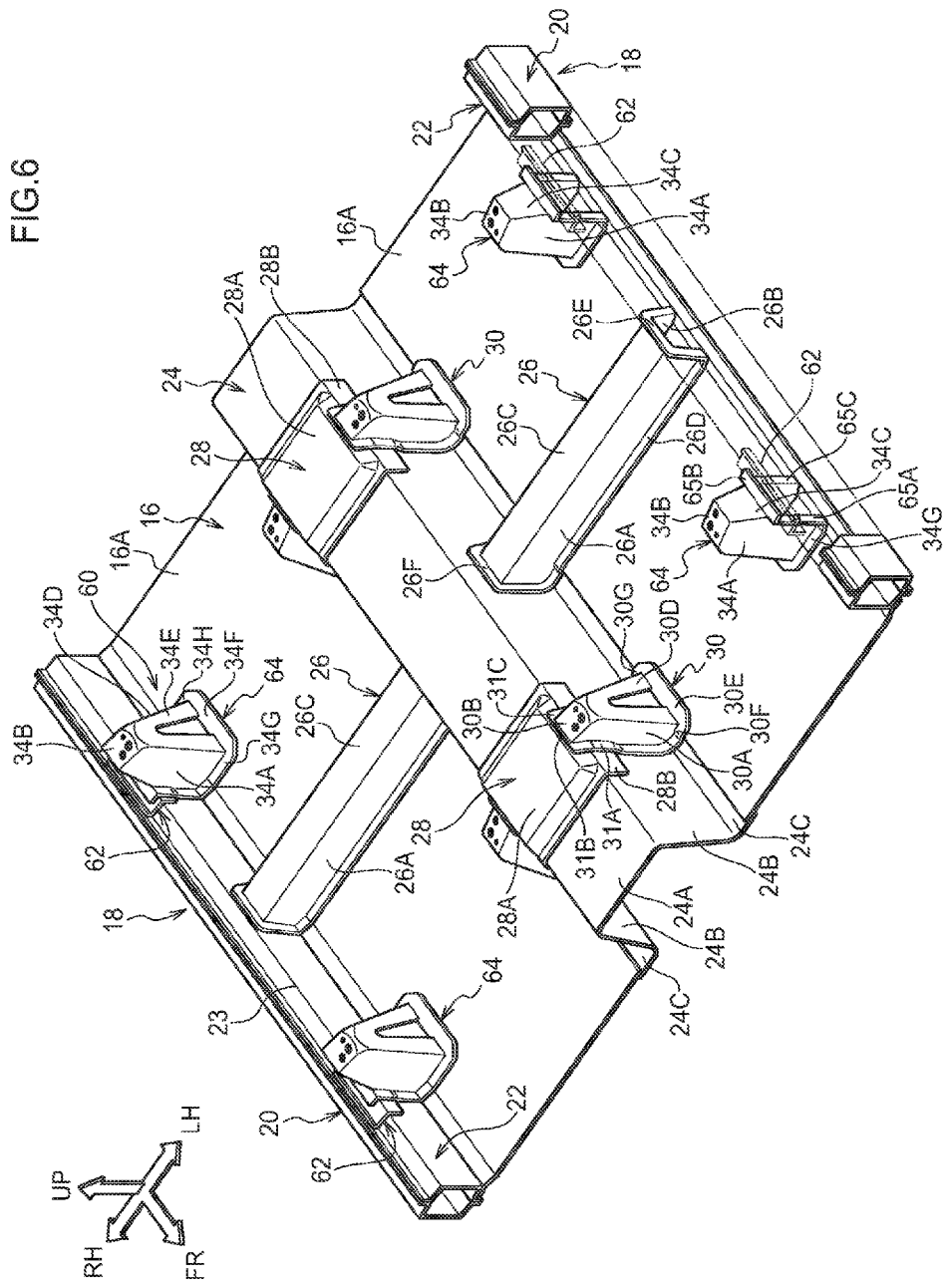
FIG. 6 is a perspective view showing a vehicle floor portion structure relating to a second embodiment.
Figure 7:
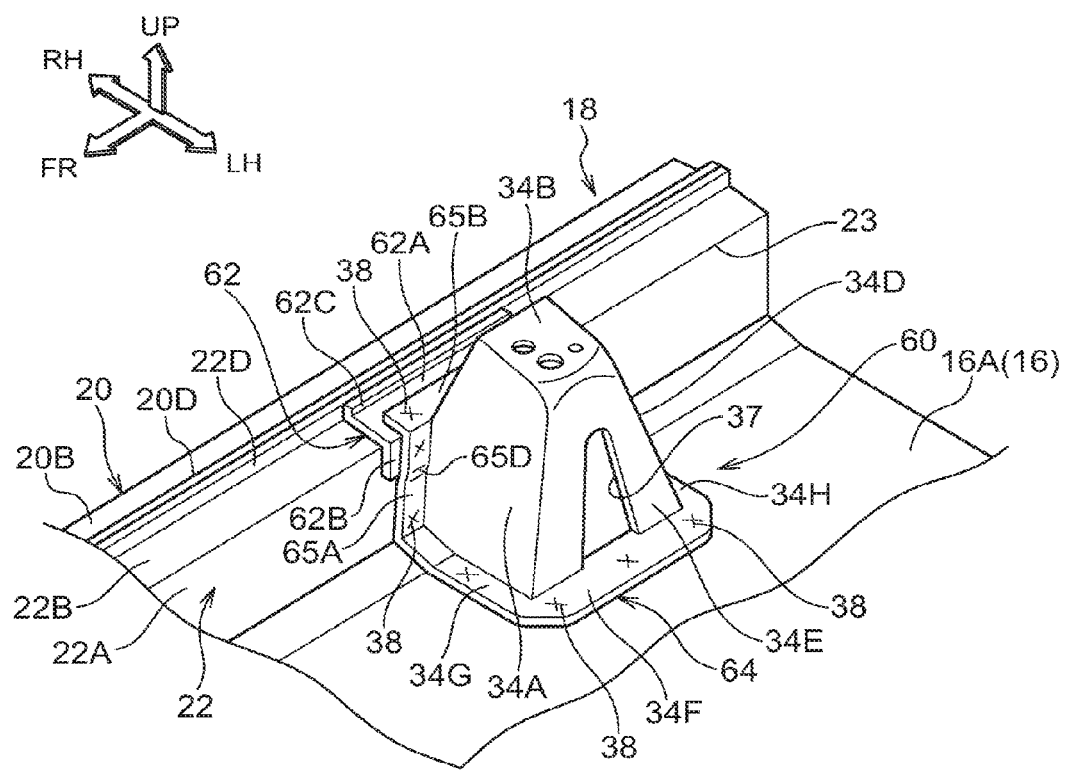
FIG. 7 is a perspective view showing the vicinity of a bracket that is joined to the rocker side and is used in the vehicle floor portion structure shown in FIG. 6.

A second embodiment of the vehicle floor portion structure relating to the present invention is described by using FIG. 6 and FIG. 7. Note that structural portions that are the same as those of the above-described first embodiment are denoted by the same reference numerals, and description thereof is omitted.

As shown in FIG. 6 and FIG. 7, at a vehicle floor portion structure 60 of the present embodiment, two reinforcements 62 that serve as on-rocker reinforcements are fixed to the upper portion of the rocker inner panel 22 of the rocker 18. The two reinforcements 62 are disposed at positions that are apart at the front side and the rear side in the vehicle longitudinal direction of the cross members 26. Upper portions of brackets 64 at the rocker 18 side are joined to the reinforcements 62, respectively.

More concretely, the reinforcement 62 has an upper wall portion 62A that is disposed so as to contact the top surface of the upper wall portion 22B of the rocker inner panel 22, and a side wall portion 62B that extends toward the vehicle lower side from the vehicle transverse direction inner side end portion of the upper wall portion 62A and contacts the side wall portion 22A of the rocker inner panel 22 (see FIG. 7). Moreover, the reinforcement 62 has an upper flange portion 62C that is bent toward the vehicle upper side from the vehicle transverse direction outer side end portion of the upper wall portion 62A and that contacts the flange portion 22D of the rocker inner panel 22. The reinforcement 62 is joined by the rocker inner panel 22 by welding or the like.

The lower flange portion 34G and the outer flange portion 34F and the lower flange portion 34H that serve as the bottom portion are provided at the bracket 64. The lower flange portion 34G and the outer flange portion 34F and the lower flange portion 34H are fixed to the floor panel 16A by the joined portions 38 that are formed by spot welding. Further, the bracket 64 has a front flange portion 65A that serves as the side portion and that is bent toward the vehicle front side from the vehicle transverse direction outer side end portion of the front wall portion 34A, and an upper flange portion 65B that extends toward the vehicle transverse direction outer side from the vehicle transverse direction outer side end portion of the inclined portion 34C. Moreover, the bracket 64 has a rear flange portion 65C that serves as the side portion and that is bent toward the vehicle rear side from the vehicle transverse direction outer side end portion of the rear wall portion 34D (see FIG. 6). The front flange portion 65A and the upper flange portion 65B and the rear flange portion 65C are formed in continuation. The lower portion sides of the front flange portion 65A and the rear flange portion 65C are fixed by the joined portions 38 to the side wall portion 22A of the rocker inner panel 22. Further, the upper portions of the front flange portion 65A and the rear flange portion 65C, and the upper flange portion 65B, are fixed to the reinforcement 62 by the joined portions 38. Step portions 65D are formed at the vehicle vertical direction intermediate portions of the front flange portion 65A and the rear flange portion 65C, along the step between the side wall portion 22A of the rocker inner panel 22 and the side wall portion 62B of the reinforcement 62.

Moreover, the length, in the vehicle longitudinal direction, between the front wall portion 34A and the rear wall portion 34D at the bottom portion side (the lower flange portion 34G and the lower flange portion 34H side) of the bracket 64 is structured to be longer than the length, in the vehicle longitudinal direction, between the front wall portion 34A and the rear wall portion 34D at the upper portion side (the upper wall portion 34B side) of the bracket 34.

In the vehicle floor portion structure 60, when load from the passenger P is transmitted to the bracket 64 at the time of a front collision of the vehicle 12, a concentration of stress at the joined portion (joined place) of the floor panel 16A and the bottom portion of the bracket 64 can be suppressed. Further, in the vehicle floor portion structure 60, the reinforcement 62 is fixed to the upper portion of the rocker inner panel 22 at the rocker 18. The upper portions of the front flange portion 65A and the rear flange portion 65C, and the upper flange portion 65B, of the bracket 64 are joined to the reinforcement 62. Due thereto, due to load from the passenger P being transmitted from the bracket 64 to the reinforcement 62 at the time of a front collision of the vehicle 12, load can be dispersed more effectively.

Note that, in the vehicle floor portion structures of the first and second embodiments, the upper portions of all of the brackets 30 at the tunnel portion 24 side are joined to the on-tunnel reinforcement 28 that is fixed to the upper portion of the tunnel portion 24, but the present invention is not limited to this structure. For example, there may be a structure in which the upper portions of all of the brackets 30 at the tunnel portion 24 side, or the upper portions of some of the brackets 30, are joined directly to the upper portion of the tunnel portion 24 without the on-tunnel reinforcement 28 interposed therebetween. Further, in the present invention, there may be a structure in which only the on-tunnel reinforcement that is fixed originally to the upper portion of the tunnel portion 24 is used, and the upper portions of the brackets 30 at the tunnel portion 24 side are joined to the on-tunnel reinforcement. Further, the shape of the on-tunnel reinforcement 28 also is not limited to the shape of the above-described embodiments, and can be changed into another shape.

Further, in the vehicle floor portion structure of the second embodiment, the upper portion sides of all of the brackets 64 at the rocker 18 side are joined to the reinforcements 62 that are fixed to the upper portion of the rocker inner panel 22 of the rocker 18, but the present invention is not limited to this structure. For example, there may be a structure in which the upper portions of some of the brackets 64 at the rocker 18 side are joined directly to the upper portion of the rocker inner panel 22 at the rocker 18, without the reinforcements 62 being interposed therebetween.

Further, in the vehicle floor portion structures of the first and second embodiments, the upper flange portions 31B of the brackets 30 are not joined to the on-tunnel reinforcements 28, but the present invention is not limited to this structure. For example, there may be a structure in which the upper flange portions 31B are extended in the vehicle transverse direction and are joined to the on-tunnel reinforcements 28 or the upper portion of the tunnel portion 24.

The disclosure of Japanese Patent Application No. 2015-205882 that was filed on Oct. 19, 2015 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A vehicle floor portion structure comprising:
    a floor panel that structures a floor portion of a vehicle;
    a tunnel portion that extends in a vehicle longitudinal direction at a vehicle transverse direction central portion of the floor panel, and that projects-out toward a vehicle vertical direction upper side;
    a cross member that is bridged, along a vehicle transverse direction, between the tunnel portion and a rocker that extends in the vehicle longitudinal direction at a vehicle transverse direction outer side of the floor panel;
    a bracket that is disposed so as to be apart from the cross member in the vehicle longitudinal direction, whose bottom portion is fixed to the floor panel, and whose side portion is fixed to a side wall portion of the tunnel portion, a length, in the vehicle longitudinal direction, between a front wall and a rear wall at a bottom portion side of the bracket being structured to be longer than a length, in the vehicle longitudinal direction, between the front wall and the rear wall at an upper portion side of the bracket, and the bracket being configured to be fixed to a seat; and
    a reinforcement that is provided at an upper portion of the tunnel portion, and to which an upper portion of the bracket is joined.

2. The vehicle floor portion structure of claim 1, wherein the upper portion of the bracket is joined to a position that extends over a ridgeline portion that is a border between a side wall portion and an upper wall portion at the tunnel portion.

3. The vehicle floor portion structure of claim 1, wherein:
    the reinforcement is an on-tunnel reinforcement that is provided at an upper portion of the tunnel portion,
    the side portion of the bracket is joined to a side wall portion of the tunnel portion, and the upper portion of the bracket is joined to the on-tunnel reinforcement.

4. A vehicle floor portion structure comprising:
    a floor panel that structures a floor portion of a vehicle;
    a tunnel portion that extends in a vehicle longitudinal direction at a vehicle transverse direction central portion of the floor panel, and that projects-out toward a vehicle vertical direction upper side;

a cross member that is bridged, along a vehicle transverse direction, between the tunnel portion and a rocker that extends in the vehicle longitudinal direction at a vehicle transverse direction outer side of the floor panel;

a bracket that is disposed so as to be apart from the cross member in the vehicle longitudinal direction, whose bottom portion is fixed to the floor panel, and whose side portion is fixed to a side wall portion of the rocker, a length, in the vehicle longitudinal direction, between a front wall and a rear wall at a bottom portion side of the bracket being structured to be longer than a length, in the vehicle longitudinal direction, between the front wall and the rear wall at an upper portion side of the bracket, and the bracket being configured to be fixed to a seat; and a reinforcement that is provided at an upper portion of the rocker, and to which an upper portion of the bracket is joined, wherein the bracket includes:

an upper wall portion that connects an upper end portion of the front wall, an upper end portion of the rear wall, and an upper end portion of a side wall; and an inclined portion that extends from the upper wall portion toward a vehicle width direction outer side and a vehicle vertical direction lower side, and wherein a joining portion is fixed to the rocker at lower portion of the inclined portion.

5. The vehicle floor portion structure of claim 4, wherein:

the reinforcement is an on-rocker reinforcement that is provided at an upper portion of the rocker, the side portion of the bracket is joined to a side wall portion of the rocker, and the upper portion of the bracket is joined to the on-rocker reinforcement.

* * * * *